UNITED STATES PATENT OFFICE.

ARMIN GROB, OF BASEL, SWITZERLAND, ASSIGNOR TO THE FIRM OF BASLE CHEMICAL WORKS OF BASEL, SWITZERLAND.

VIOLET VAT DYESTUFF AND PROCESS OF MAKING SAME.

No. 904,867.

Specification of Letters Patent.

Patented Nov. 24, 1908.

Application filed June 23, 1908. Serial No. 439,835.

*To all whom it may concern:*

Be it known that I, ARMIN GROB, a citizen of the Swiss Republic and resident of Basel, Switzerland, have invented a new Violet Vat Dyestuff and a Process of Making Same, of which the following is a full, clear, and exact specification.

I have found that by reacting with acenaphthene-quinone upon indoxyl a new violet vat-dyestuff is obtained. This reaction is preferably carried out by heating a solution or suspension of the parent materials in aqueous alcohol and by adding a condensing agent, as for instance sodium carbonate, piperidin etc. to the said hot solution or suspension.

The manufacture of the new dyestuff is explained by the following example:

Example: 18.2 parts of acenaphthene-quinone and 13.3 parts of indoxyl are suspended in 1000 parts of alcohol of 90 per cent. and the mixture is heated. By adding an aqueous solution of 2.5 parts of calcinated soda or a trace of piperidin to the hot mixture the dyestuff separates at once in violet scales which are isolated by filtration.

The dyestuff dissolves in concentrated sulfuric acid to a green solution and on addition of water it is precipitated therefrom as violet flakes. It is difficultly soluble in hot alcohol with a blue-violet coloration, but more easily in hot benzene with a red-violet coloration. From its solution in benzene the dyestuff can be recrystallized and thus be separated from a small quantity of indigo, which is formed simultaneously.

With an alkaline solution of sodium hydrosulfite, the dyestuff yields a reddish, gray-violet vat from which unmordanted cotton is dyed violet shades.

What I claim is:

1. The described process for the manufacture of a violet dyestuff consisting in heating acenaphthene-quinone with indoxyl in aqueous alcohol and in adding a small quantity of a condensing agent to the hot mass thus obtained.

2. The described process for the manufacture of a violet dyestuff consisting in heating acenaphthene-quinone with indoxyl in aqueous alcohol and in adding a small quantity of soda to the hot mass thus obtained.

3. As a new article of manufacture, the herein-described violet vat-dyestuff, derived from acenaphthene-quinone and indoxyl, soluble in concentrated sulfuric acid with a green coloration, difficultly soluble in hot alcohol with a blue-violet coloration, more easily soluble in hot benzene with a red-violet coloration and dyeing unmordanted cotton from a reduced alkaline vat in violet shades.

In witness whereof I have hereunto signed my name this 12th day of June 1908, in the presence of two subscribing witnesses.

ARMIN GROB.

Witnesses:
 AMAND RITTER,
 ERNST WAGNER.